United States Patent [19]

Schaffer et al.

[11] Patent Number: 5,593,492
[45] Date of Patent: Jan. 14, 1997

[54] WELD THROUGH PRIMER

[75] Inventors: Peter Schaffer, Phoenixville, Pa.; Scott Armstrong, Lakewood, Ohio

[73] Assignee: Inorganic Coating, Inc., Malvern, Pa.

[21] Appl. No.: 521,552

[22] Filed: Aug. 30, 1995

[51] Int. Cl.$^6$ .............................. B23K 35/22; C09D 1/04; C09D 5/00
[52] U.S. Cl. .................. 106/623; 106/14.05; 106/14.11; 106/14.44; 106/287.1; 148/23; 148/24
[58] Field of Search .......................... 106/14.05, 14.11, 106/14.44, 623, 287.1; 148/23, 24

[56] References Cited

U.S. PATENT DOCUMENTS

| | | | |
|---|---|---|---|
| 3,493,401 | 2/1970 | Schutt et al. | 106/623 |
| 3,549,395 | 12/1970 | Sears et al. | 106/623 |
| 3,620,784 | 11/1971 | Schutt | 106/623 |
| 3,721,574 | 3/1973 | Schneider et al. | 106/623 |
| 4,162,169 | 7/1979 | Schutt | 106/634 |

FOREIGN PATENT DOCUMENTS

| | | | |
|---|---|---|---|
| 53-119932 | 10/1978 | Japan | 106/623 |
| 298623 | 3/1971 | U.S.S.R. | 106/623 |

*Primary Examiner*—Anthony Green
*Attorney, Agent, or Firm*—Weintraub, DuRoss & Brady

[57] ABSTRACT

A corrosion inhibiting primer for metal pieces which need not be removed prior to welding the pieces includes an alkali metal silicate binder having a silicone wetting agent incorporated therewith, a powder metal and an oxygen scavenger. The primer can be sprayed onto the metal. Zero porosity welds can be achieved up to speeds of about 750 mms/sec. by welding through the primer.

10 Claims, No Drawings

WELD THROUGH PRIMER

BACKGROUND OF THE INVENTION

1. Field of the Invention

The present invention relates to coating compositions. More particularly, the present invention concerns coating compositions for metals. Even more particularly, the present invention relates to weld through primers.

2. Prior Art

Conventionally, and as is known to those skilled in the art, steel and other metal fabrication involves the welding together of the ends of sides of pieces of the metal. Ordinarily, the metal to be welded is warehoused or stored in an open environment, thereby exposing the metal to the elements. This leads to the oxidation of the metal surface which, in turn, impedes the welding. Thus, the weld surfaces must be cleaned and the oxidation removed prior to welding. Otherwise, an inadequate weld will be obtained.

Heretofore, in order to somewhat alleviate the oxidation problem, primers or other metal coatings have been applied to the metal parts prior to storage. However, the primer must be removed before welding to preclude formation of an unacceptable, porous weld.

Thus, it is to be appreciated that a significant advance in the art would be provided by a metal primer which abated metal oxidation and which did not have to be removed prior to welding. It is to this to which the present invention is directed.

SUMMARY OF THE INVENTION

In accordance with the present invention there is provided a metal primer coating composition which need not be removed prior to welding the metal. The present composition, generally, comprises a mixture of:

(a) an alkali metal silicate binder having a wetting agent therewith;

(b) a powdered metal; and (c) an oxygen scavenger.

The composition is a liquid which is sprayable onto the metal surface at a temperature greater than about 70° F.

The binder is an aqueous alkali metal silicate dispersion, having a high mole ratio of silicon dioxide to alkali metal oxide. The binder causes the primer to adhere to the metal surface.

The powdered metal may be any suitable finely divided powder such as copper, nickel, zinc, aluminum, tin, magnesium, cadmium, lead and the like as well as mixtures thereof. The oxides of such metals may also be used herein, as well as mixtures thereof.

The oxygen scavenger is preferably an inorganic compound, such as a metal silicate, a metal silicide, a metal phosphate, a metal chromate, a metal oxide, a metal hydroxide and the like. Suitable means include boron, aluminum, magnesium and the like. Organic oxidants may be used, though.

The wetting agent is a silicone-based wetting agent such as a siloxane or silane.

For a more complete understanding of the present invention reference is made to the following detailed description and accompanying examples.

DESCRIPTION OF THE PREFERRED EMBODIMENTS

As hereinabove noted, the present invention provides a metal primer coating composition particularly adapted for coating steel, iron, and the like and which need not be removed prior to the welding thereof.

The primer hereof generally comprises, in admixture:

(a) an alkali metal silicate binder having a wetting agent present therewithin;

(b) a powdered metal; and (c) an oxygen scavenger.

The primer hereof is a liquid which is applied to the metal surface by any suitable mode, such as by immersion, spraying or the like. Generally, the primer is sprayed at a temperature above about 70° F., and usually at about 70° F. to about 95° F.

Preceding the application of the primer, the metal is cleaned to remove any impurities therefrom. Cleaning can be accomplished in any of a plurality of ways such as, for example, by abrasion, by electrocleaning, by acid or alkaline cleaning, by steam cleaning and the like.

Abrading can be accomplished by blasting the metal piece with an abrasive material, such as finely divided aluminum oxide particles, fine grit, etc.

The electrocleaning step employs an alkaline electrocleaner, such as that sold under the name ISOPREP S52-L by Witco Corporation, where the piece is immersed in the cleaning solution and is then exposed to an electrical current passing through the solution. Usually, the current is between about 10 to about 80 amperes per square foot of metal piece. After the piece is removed form the bath, it is rinsed with water and dried with either heated or ambient air.

Acid cleaning is typically achieved by immersion of the piece to be cleaned in an acidic solution, and thereafter rinsing and drying the piece.

Alkaline cleaning usually employs a caustic alkaline cleaning solution in which the piece is immersed followed by the rinsing and drying thereof.

Alternatively, and as noted hereinabove, the piece may be cleaned by impinging a jet stream spray on the piece for about one to ten minutes.

As noted, after the piece is cleaned the primer is applied thereonto.

The alkali metal silicate binder used in formulating the primer is preferably either an aqueous potassium silicate or sodium silicate dispersion having a high silicon dioxide to alkali metal oxide ratio. Generally, the ratio ranges from about 4.8:1 to about 6.0:1. A silicone, which functions as a wetting agent, is added to the mix to form a hydrogel sol.

Preferably, the binder comprises from about twenty to about thirty percent, by weight, of potassium silicate, from about seventy to about eighty percent, by weight, of water and from about 0.5 to about five percent and preferably from one to about three percent, by weight, of the silicone.

It should be noted that the silicone enhances the sprayability of the product. Without its presence a rough surface may be encountered. If such is satisfactory, then the silicone may be eliminated.

Typically, the silicone is employed as a silane corresponding to the formula RSiOR', where R and R' are each substituted or unsubstituted linear alkyl having from about 1 to 4 carbon atoms in the alkyl portion thereof. Representative of useful silanes are, for example, butyltrimethoxysilane, chloropropyltrimethoxysilane, methyltrimethoxysilane, and the like as well as mixtures thereof.

Other useful wetting agents include the siloxanes corresponding to the formula:

(Si-O-Si)

such as the polydimethylsiloxane fluids.

Preferably, however, the wetting agent is a silane and, in particularly, methyltrimethoxysilane.

The binder contemplated for use herein is more particularly described in U.S. Pat. No. 4,162,169, the disclosure of which is hereby incorporated by reference.

The primer hereof also includes a metal which is physically deployed as either powder, dust or flakes, and preferably as a finely divided powder metal. Among the useful metals are, for example, zinc, aluminum, copper, lead, nickel, magnesium, cadmium and the like, as well as mixtures thereof. The oxides of such metals may also be used, as well as mixtures thereof. Additionally, mixtures of the oxides and the metals may be used. Preferably, finely divided powdered zinc is employed herein. Generally, from about 1.3 to about 3.0 parts, by weight, of the metal per part of binder is employed. Preferably, the metal is employed in an amount ranging from about 1.90 to about 2.25 parts thereof per part of binder is employed.

The oxygen scavenger is preferably an inorganic compound which scavenges oxygen during the welding process to preclude entrapment of oxygen bubbles in the weld zone which leads to porosity and a poor weld. The oxygen scavenger is present in an amount ranging from about 0.5 to about 5.0 parts by weight thereof per one hundred parts, by weight, of metal, and preferably from about one to about three parts by weight thereof per one hundred parts by weight of metal. The oxygen scavenger is preferably either a metal phosphate, metal chromate, metal nitrite, metal oxide, metal hydroxides and the like. Suitable metals include boron, sodium, calcium, aluminum, magnesium, and the like, as well as mixtures thereof. Although not as preferred, certain organic corrosion inhibitors such as the benzoates, for example, sodium benzoate and ammonium benzoate, as well as quaternary ammonium compounds and EDTA or the sodium salt thereof may be used herein. The criticality to be attached to the oxygen scavenger is that it scavenges the oxygen liberated during welding and that it be compatible with the binder.

In the practice of the present invention the preferred oxygen scavenger is aluminum trihydroxide.

The primer is prepared by blending the ingredients at high speed, as described in the aforementioned patent.

It has been found that the primer hereof can be welded through, with zero porosity, at weld speeds of up to about 750 mms/sec.

For a more complete understanding of the present invention reference is made to the following examples. In the examples, which are to be construed as illustrative and not limitative of the invention, all parts are by weight, absent contrary indications.

EXAMPLE I

A primer composition is prepared by admixing together, at 500 rpms, the following ingredients in the stated amounts:

| Ingredient | Amount, pbw |
| --- | --- |
| Binder[1] | 7.3 |
| Powdered Zinc[2] | 13.74 |
| Alumina Hydrate | 0.26 |

(1) a potassium silicate binder having an $SiO_2$ to $K_2$ ratio of about 5.3 prepared in accordance with U.S. Pat. No. 4,162,169, and sold by Inorganic Coatings, Inc. under the name IC 531 Automotive to which is added 1.7 parts by weight of methyltrimethoxysilane.
(2) Purity low lead zinc.

The primer was then coated onto structural steel pieces which were then welded together and tested for conformity with U.S. Navy Mil Specs 248C. The so-coated welded pieces passed this specification, as well as standard shipyard practices.

Having thus described the invention, what is claimed is:
1. A primer composition for metal to be welded comprising:
   (a) a binder including an alkali metal silicate, a silicone wetting agent and water;
   (b) a powdered metal; and
   (c) an oxygen scavenger for the metal to be welded.
2. The primer composition of claim 1 wherein:
   (a) the alkali metal silicate is selected from the group consisting of sodium silicates, potassium silicate and mixtures thereof;
   (b) the silicone wetting agent is a silane;
   (c) the powdered metal is selected from the group consisting of zinc, copper, cadmium and mixtures thereof; and
   (d) the oxygen scavenger is selected from the group consisting of metal phosphate, metal chromate, metal oxide, metal hydroxide, metal nitrite, metal benzoate, ammonium benzoate, sodium salt of ethylene diamine tetraacetic acid and mixtures thereof.
3. The primer composition of claim 2 wherein:
   (a) the powdered metal is present in a weight ratio to binder ranging from about 1.3:1 to about 3.0:1;
   (b) the oxygen scavenger is present in an amount ranging from about 0.5 to about 5 parts by weight thereof per one hundred parts by weight of metal; and
   (c) the silicone wetting agent is present in an amount ranging from about one to about three parts, by weight, per one hundred pans, by weight, of the binder.
4. The primer composition of claim 3 wherein: the silane is methyltrimethoxysilane.
5. The primer composition of claim 3 wherein: the oxygen scavenger is aluminum trihydroxide.
6. The primer composition of claim 3 wherein: the alkali metal silicate is potassium silicate.
7. The primer composition of claim 3 wherein: the powdered metal is zinc.
8. The primer composition of claim 3 wherein:
   (a) the alkali metal silicate is potassium silicate;
   (b) the silane is methyltrimethoxysilane;
   (c) the oxygen scavenger is aluminum trihydroxide; and
   (d) the powdered metal is zinc.
9. A primer composition for metal to be welded comprising:
   (a) a binder including an alkali metal silicate, a silicone wetting agent and water;
   (b) a powdered metal, the powdered metal being present in a weight ratio to the binder ranging from about 1.3: 1 to about 3.0: 1;
   (c) an oxygen scavenger, the oxygen scavenger being present in an amount ranging from about 0.5 to about 5 parts by weight thereof per one hundred parts by weight of metal; and
   (d) the silicone wetting agent being present in an amount ranging from about one to about three parts, by weight, per one hundred parts, by weight, of the binder.
10. The primer composition of claim 9 wherein:
    the oxygen scavenger is aluminum trihydroxide.

\* \* \* \* \*